Figure 1:
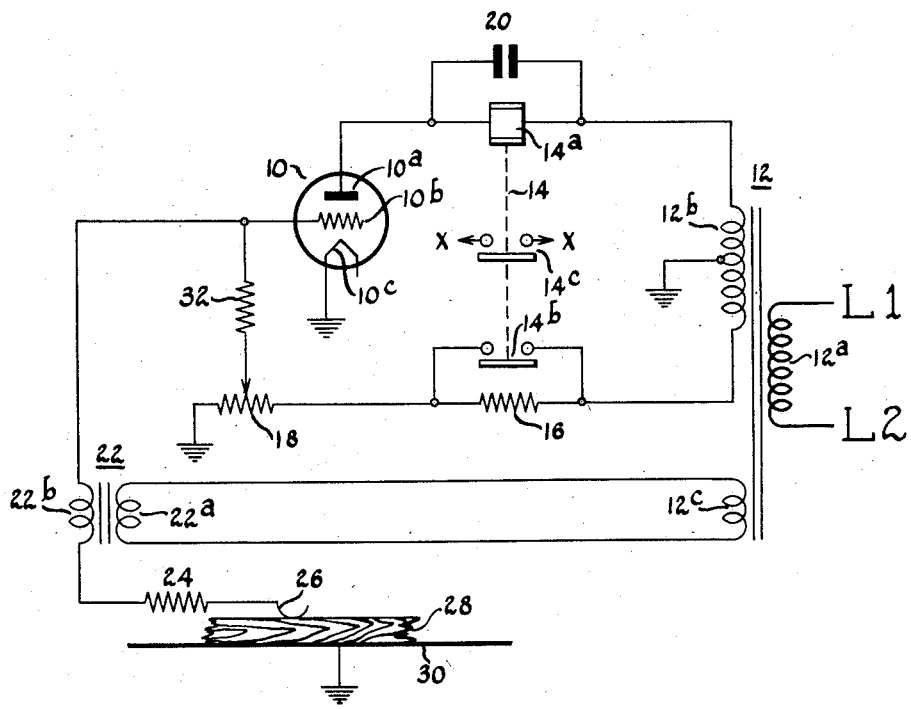

April 28, 1959 C. W. LUDVIGSEN 2,884,594
INSTRUMENTS FOR MEASURING ELECTRICAL RESISTANCE
Filed Dec. 9, 1954 2 Sheets-Sheet 1

Inventor
Carl W. Ludvigsen
By Grover C. Frater
Attorney

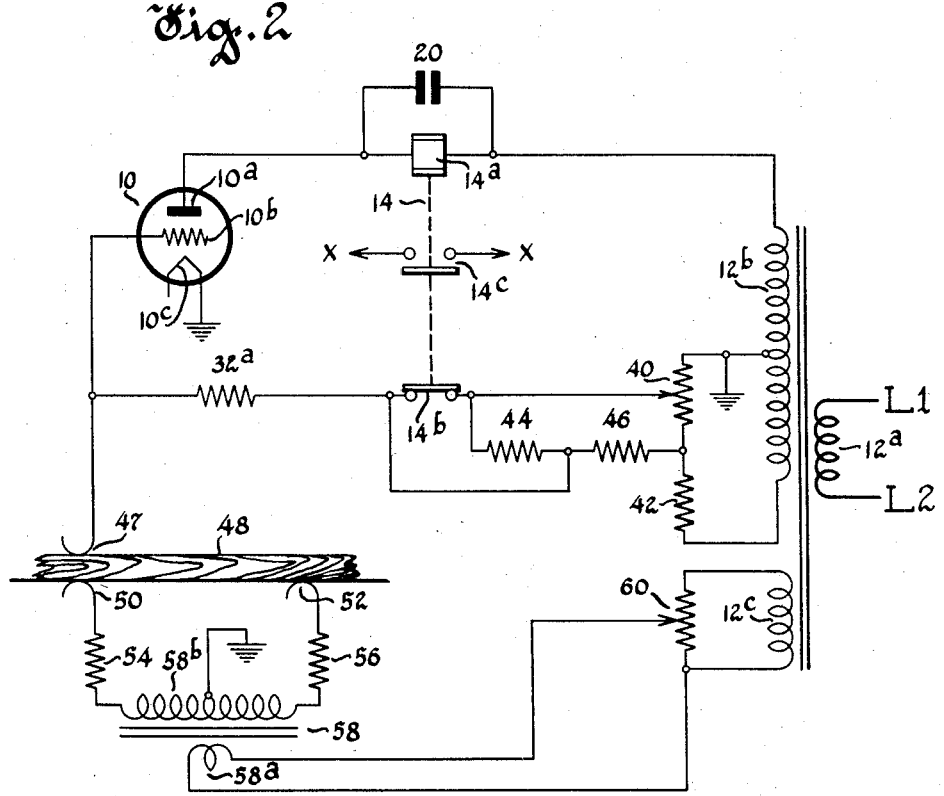

United States Patent Office 2,884,594
Patented Apr. 28, 1959

2,884,594

INSTRUMENTS FOR MEASURING ELECTRICAL RESISTANCE

Carl W. Ludvigsen, Los Altos, Calif., assignor to Cutler-Hammer, Inc., Milwaukee, Wis., a corporation of Delaware Application December 9, 1954, Serial No. 474,077

5 Claims. (Cl. 324—62)

This invention relates to instruments for measuring electrical resistance. More particularly, it relates to instruments which are especially useful for detecting values of resistance greater than or less than a critical resistance value.

A primary object of the invention is to provide an inexpensive but improved critical resistance measuring instrument.

A further object is to provide an improved instrument for detecting with increased sensitivity resistances of very high ohmic value.

Another object of the invention is to provide an improved instrument for detecting, in wood and the like, amounts of moisture content greater than given values. It is essential, for example, in drying glue by dielectric heating in plyboard maunfacture and in continuous wood salvage processes or in inspecting kiln dried lumber that moisture contents greater than a given amount be accurately determined. The critical resistance to be detected in such processes may have a value of many megohms.

Various other objects and advantages of the invention will hereinafter appear.

Two embodiments of the invention are illustrated diagrammatically in Figs. 1 and 2 of the accompanying drawing, it being understood that various modifications may be made in the embodiments illustrated and that other embodiments are possible without departing from the spirit of the invention or the scope of the appended claims.

Referring to the drawing, the numeral 10 designates an electron tube having an anode 10$^a$, a control-electrode 10$^b$, and a cathode 10$^c$. Either a high vacuum or a gas filled tube may be employed.

Power for operating the tube 10 is supplied from an alternating source represented by a transformer 12 and supply lines L1 and L2 to which the primary winding 12$^a$ of the transformer is connected. A secondary winding 12$^b$ of the transformer has a center tap connected to a common ground, one end lead connected to anode 10$^a$ through the coil 14$^a$ of a relay 14, and the other end lead connected to ground through the series circuit combination of a resistor 16 and a potentiometer 18.

The normally open contacts 14$^b$ of a relay 14 are connected in shunt with resistor 16. A capacitor 20 is connected in shunt with coil 14$^a$.

Another secondary winding 12$^c$ of transformer 12 is shown connected to the primary winding 22$^a$ of a high tension transformer 22. The high voltage secondary winding 22$^b$ is connected in a series circuit which extends from control-electrode 10$^b$, through winding 22$^b$, through a limiting resistor 24 to an electrode 26, and thence through a work piece 28 to an electrode 30 and to ground.

A resistor 32 connected from control-electrode 10$^b$ to the tap of potentiometer 18 and a connection from cathode 10$^c$ to ground, completes the control-electrode-cathode circuit of tube 10.

Anode voltage for the tube 10 is developed across the upper one-half of winding 12$^b$ while the lower half of the winding supplies a bias voltage which appears between the tap of potentiometer 18 and ground. The anode and bias voltages are opposite in phase in respect of their effect upon current flow through tube 10. The signal voltage appearing across secondary winding 22$^b$ is phased to tend to make control-electrode 10$^b$ positive when anode 10$^a$ is positive.

When the wood or other work piece whose resistance to be measured presents reduced resistance to the electrodes 26 and 30, increased current flows through resistor 32. The voltage drop across this resistor opposes the bias voltage and results in increased flow of anode current. At a critical anode current value, actuation of relay 14 closes contacts 14$^b$. Resistor 16 is short circuited by these contacts with the result that bias voltage is increased and anode current in tube 10 is decreased. The amount of this decrease is adjusted in view of the differential between the current values at which the relay closes and opens so that only a small differential in the control-electrode voltage is required to close and open relay 14. In this respect the action of contacts 14$^b$ is to amplify the sensitivity of the circuit.

The sensitivity of the circuit is adjustable by adjustment of the bias potentiometer 18. The bias voltage may be adjusted so that anode current is just less than the value required to actuate relay 14 and so that only a small increase in signal voltage is required. Or, conversely, if it is desired that the signal voltage must change a substantial amount, the bias voltage is adjusted so that normal anode current is substantially less than the amount required to actuate the relay 14.

If a different value of resistance is to be measured so that the normal signal voltage assumes a new value, it only is required to adjust the bias voltage so that the algebraic sum of signal and bias voltages are again just less than the value to cause critical anode current to flow. Thus the sensitivity level is as readily adjusted whatever the value of resistance to be measured.

Contacts 14$^c$ of relay 14 are connected at X—X to any suitable indicator device or circuit.

It will be obvious that the circuit shown can readily be arranged to measure actual resistance values by calibrating the potentiometer 18. The relay 14 could be replaced with a milliammeter and the resistance value would appear as a potentiometer setting which caused a given anode current flow.

Resistor 16 and potentiometer 18 are arranged so that adjustment of the potentiometer to adjust the sensitivity of the unit also results in adjustment of the differential in the control electrode voltage which is required to close and open relay 14. The resistor and potentiometer are series connected so that the setting of the potentiometer tap, in addition to determining the control-electrode-cathode bias voltage, determines the degree of change in said bias voltage as contacts 14$^b$ are opened and closed.

If in a particular appdication of the unit this effect is not desired, the bias circuit may be connected as illustrated in Fig. 2. In the circuit there shown, the cathode 10$^c$ of the tube 10 is connected to common ground, the anode 10$^a$ is connected through coil 14$^a$ of relay 14 and the upper half of secondary winding 12$^b$ to common ground, the primary winding 12$^a$ of the transformer 12 is connected to lines L1 and L2, and contacts 14$^c$ are connected to an indicator device or circuit just as they are in the circuit of Fig. 1.

The center tap of winding 12$^b$ is connected to common ground. A sensitivity adjusting potentiometer 40 and a resistor 42 are connected in series across the lower half of winding 12$^b$. The control-electrode 10$^b$ of tube 10 is connected through resistor 32$^a$ and normally closed contact 14$^b$ of relay 14, to the tap of the potentiometer 40.

Control-electrode 10$^b$ is also connected through resistor 32$^a$ to the junction between resistors 44 and 46 which are connected in series from the tap of potentiometer 40 to the junction between said potentiometer 40 and resistor 42. The control-electrode 10$^b$ is further connected to a terminal 47 which engages one surface of a work piece 48.

The opposite face of the work piece 48 is engaged by two terminals 50 and 52 each of which is connected through a respectively associated one of a pair of limiting resistors 54 and 56 to an associated end of secondary winding 58$^b$ of a transformer 58. The center tap of winding 58$^b$ is connected to common ground. The primary winding 58$^a$ of this transformer is connected across the center tap and one end of a potentiometer 60 which, in turn, is connected across winding 12$^c$ of transformer 12.

In Fig. 2 the control-electrode-cathode bias voltage is developed between the tap of potentiometer 40 and common ground when contacts 14$^b$ are closed and between the junction of resistors 44 and 46 and common ground when contacts 14$^b$ are open. In this circuit the magnitude of the bias voltage, when contacts 14$^b$ are open, is not greatly affected by the position of the tap of the sensitivity adjusting potentiometer as it is affected in the circuit of Fig. 1.

The high voltage transformer 22, on the control-electrode side of the work piece in Fig. 1, has been replaced in Fig. 2 by a high voltage transformer 58 connected on the common ground side of the work piece. The secondary winding 58$^b$ of this transformer has its center tap connected to ground. By this arrangement the effect of any current leakage which might occur between the secondary winding of the transformer and ground is largely cancelled and overcome. Since, as in Fig. 1, the signal voltage applied to the control electrode 10$^b$ should be positive when the anode 10$^a$ is positive, terminal 47 engages the work piece 48 at a point near the point of engagement with said work piece of that one of terminals 50 or 52 which is positive when anode 10$^a$ is positive. In Fig. 2 transformers 12 and 58 are connected so that the left end of winding 58$^b$ is positive when the top end of winding 12$^b$ is positive.

The voltage applied to primary winding 58$^a$, and so the voltage appearing across secondary winding 58$^b$, of transformer 58 may be adjusted by adjustment of the tap of potentiometer 60.

As hereinbefore explained in connection with Fig. 1, some critical value of anode current in tube 10 is required to actuate relay 14. The bias and signal voltages are adjusted so that at a value of work piece resistance just above critical resistance the anode current flow is just less than the critical current value. When the resistance of the work piece is reduced, the voltage drop across the work piece is reduced. The signal voltage, which is a measure of the difference between the voltage drop across the work piece and the voltage across one-half of secondary winding 58$^b$, is increased. Accordingly, anode current is increased.

It will be apparent that sensitivity of the circuit can be adjusted by adjustment of potentiometer 40 or potentiometer 60 or both. In any given application both or only one of these potentiometers may be provided. Also it will be apparent that other devices for adjusting voltages, such for example as a variable autotransformer, may be employed to adjust sensitivity.

I claim:

1. In combination, an electron tube having an anode, a control-electrode and a cathode, an electro-responsive indicating device and a source of alternating electrical voltage connected to said anode and cathode, a source of adjustable alternating voltage connected to said control-electrode and cathode, and a source of alternating voltage having an intermediate voltage tap connected to said cathode and having end voltage taps, a pair of electrodes for engagement with one side of a resistive element each connected to a respectively associated end tap of said source last mentioned, a third electrode connected to said control-electrode and engageable with the opposite side of said resistive element at a point nearer to one electrode of said pair of electrodes than to the other whereby the voltages applied to said control-electrode by said source last mentioned and said source of adjustable voltage are oppositely phased, and means sensitive of operation of said indicating means to alter the relative magnitudes of said oppositely phased voltages.

2. In an instrument for detecting resistance values, an electric discharge device having an anode, a cathode and a control electrode, means in circuit with said anode operable to afford a signal at one value of anode current and to terminate said signal at another value of anode current, means for applying to said control electrode a voltage to normally bias said device to cut-off, means for applying to said control electrode a voltage having a substantially constant effective magnitude which is a function of a given resistance to be measured thereby to afford said one value of anode current if the value of the measured resistance is in a predetermined range, and means responsive to operation of the first mentioned means for altering the magnitude of said bias voltage to increase the sensitivity of the instrument by decreasing the difference in signal voltage required to effect operation of said first mentioned means to terminate said signal.

3. In an instrument for measuring resistance values, an electron tube having an anode, a cathode and a control electrode, an alternating source of anode power, indicating means in circuit with said anode and operable to afford a signal at one value of anode current and to terminate said signal at another value of anode current, means for applying to said control electrode an alternating bias voltage in phase opposition to the voltage of said anode power source to normally bias said tube to cut-off, means for applying to said control electrode an alternating input voltage in phase with the voltage of said anode power source and having a constant effective magnitude which is a function of a given resistance to be measured thereby to afford said one value of anode current if the value of the measured resistance is within a predetermined range, and means responsive to operation of said indicating means for altering the magnitude of said bias voltage whereby the difference in input voltage required to effect operation of said indicating means to terminate said signal is decreased.

4. In an instrument for measuring resistance, in combination, an electron discharge device having an anode, a cathode, and a control electrode, a source of alternating electrical power connected in circuit with said anode and said cathode, a source of alternating negative bias voltage and adjustable impedance means connected in series circuit to said control electrode and cathode so that the bias voltage applied to said control electrode is substantially opposite in phase from the voltage applied to said anode, a source of alternating voltage and terminals for connection to an element whose resistance is to be measured connected in series to said control electrode and cathode so that the control voltage applied thereby to said control electrode is in phase with the voltage applied to said anode and has a constant effective magnitude for a given value of resistance to be measured, and indicating means responsive to a predetermined value of anode current for adjusting said impedance means to decrease the variation in control voltage required to effect deenergization of said indicating means.

5. In an instrument for measuring resistance values, an electron discharge device having an anode, a control electrode and a cathode, a source of alternating voltage connected to said anode, means for applying to said control electrode a signal voltage in phase with said anode voltage and having a constant effective magnitude which is a function of a given resistance to be measured, means for applying to said control electrode an adjustable alternating bias voltage in phase opposition to said signal voltage, means sensitive to a predetermined magnitude of anode current to alter the relative magnitudes of said oppositely-phased control electrode voltages, and means responsive to said sensitive means substantially to reduce the effect of altering said relative magnitudes on the differential in the magnitudes of said oppositely-phased voltages subsequently detectable by said sensitive means whereby the sensitivity of the instrument for its initial response may be adjusted without significantly affecting its ability instantaneously to reset preparatory to another test.

References Cited in the file of this patent

UNITED STATES PATENTS

| | | |
|---|---|---|
| 2,412,571 | Few | Dec. 17, 1946 |
| 2,536,022 | Beach et al. | Jan. 2, 1951 |
| 2,566,367 | Peters | Sept. 4, 1951 |
| 2,626,982 | Collins | Jan. 27, 1953 |
| 2,632,040 | Rabinow | Mar. 17, 1953 |
| 2,635,225 | Hadady | Apr. 14, 1953 |
| 2,731,559 | Marshall | Jan. 17, 1956 |

FOREIGN PATENTS

| | | |
|---|---|---|
| 806,977 | Germany | June 21, 1951 |